United States Patent [19]
Davis et al.

[11] Patent Number: 5,660,371
[45] Date of Patent: Aug. 26, 1997

[54] ISOLATION DAMPER WITH REPLACEABLE SEAL UNIT

[75] Inventors: Dennis Leroy Davis, Blue Springs; Michael Gene Wiltfong, Blairstown, both of Mo.

[73] Assignee: Tomkins Industries, Inc., Dayton, Ohio

[21] Appl. No.: 567,314

[22] Filed: Dec. 5, 1995

[51] Int. Cl.⁶ .................................................. F16K 3/00
[52] U.S. Cl. ................................... 251/327; 251/329
[58] Field of Search ............................ 251/327, 328, 251/329; 137/315

[56] References Cited

U.S. PATENT DOCUMENTS

| | | | |
|---|---|---|---|
| 3,000,608 | 9/1961 | Williams | 251/329 X |
| 3,689,028 | 9/1972 | Dickenson et al. | 251/329 X |
| 4,749,168 | 6/1988 | Maxwell et al. | 251/327 X |

*Primary Examiner*—John Fox
*Attorney, Agent, or Firm*—Shook, Hardy & Bacon L.L.P.

[57] ABSTRACT

An isolation damper for positioning in a duct passageway has a housing which forms a sealing chamber. The housing has a removable access panel for providing access to the sealing chamber. The damper has a blade which is capable of being actuated between an open position, wherein it allows passage of gas through the housing, and a closed position, wherein the passage of gas through the housing is blocked. A replaceable seal unit is slidably positionable within the sealing chamber by removing the access panel. The seal unit includes a first sealing plate and a second sealing plate. Each plate has an opening formed therein to allow passage of gas therethrough. Further, each plate also has a flexible sealing member attached thereto and extending about the periphery of the opening. The sealing members contact opposite surfaces of the blade when the blade is in its closed position to prevent passage of gas through the housing.

1 Claim, 3 Drawing Sheets

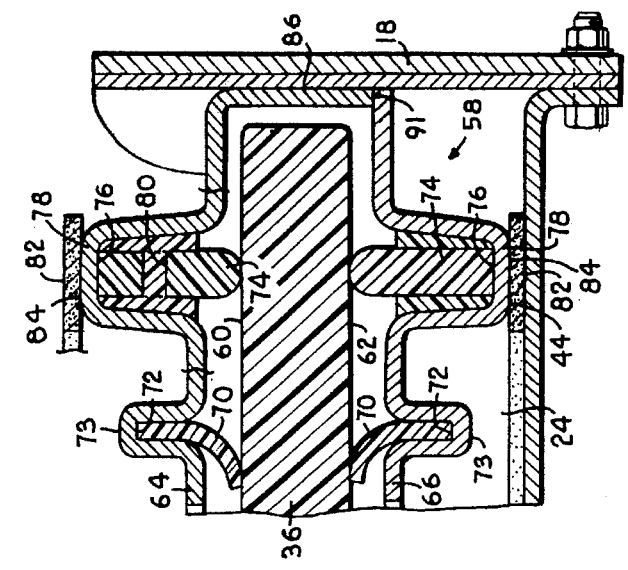
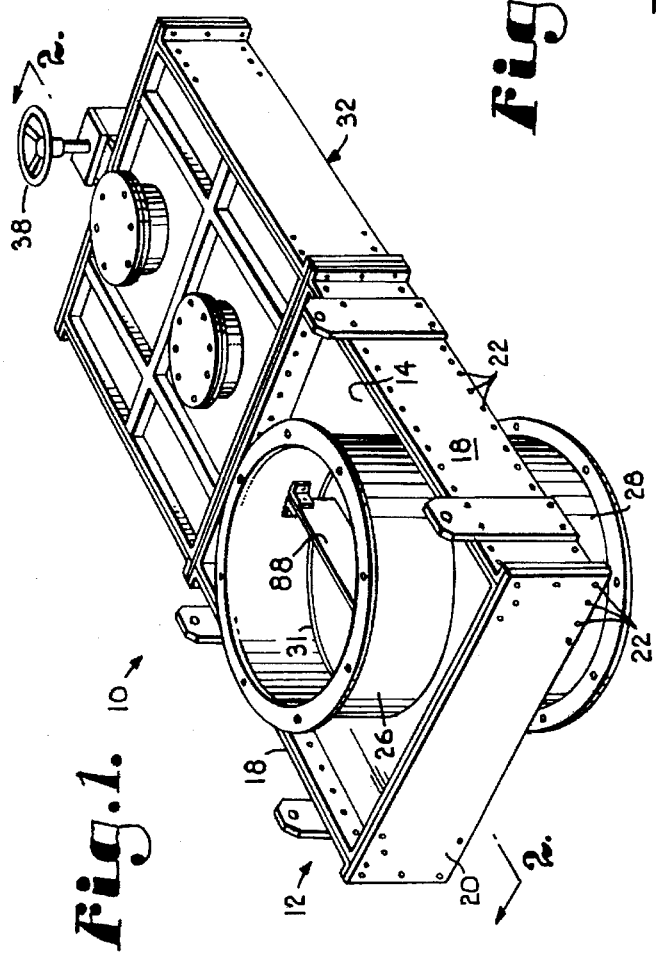
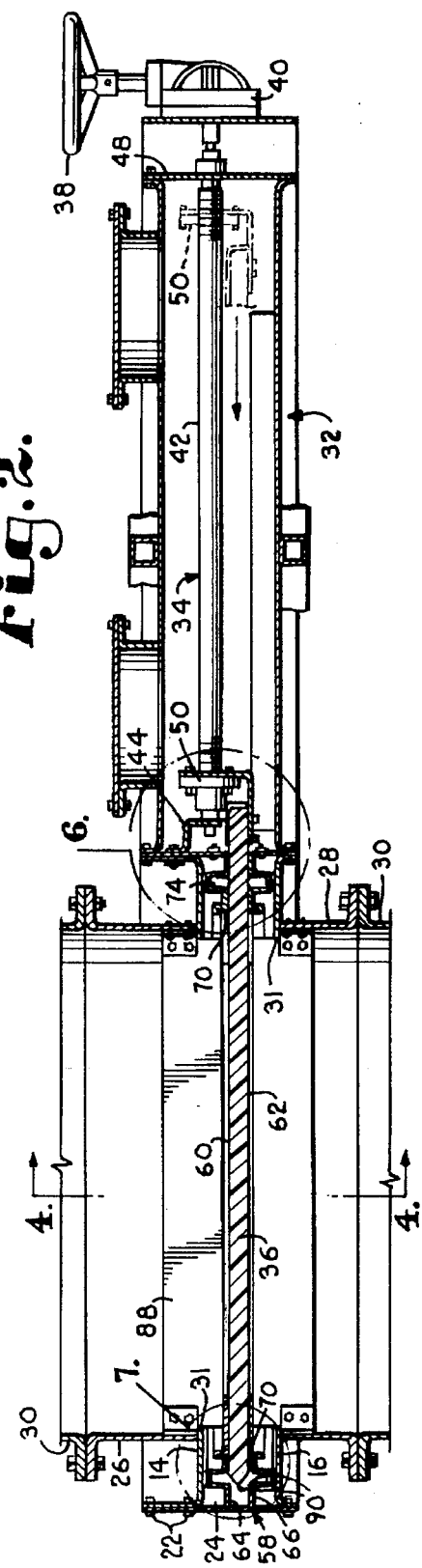

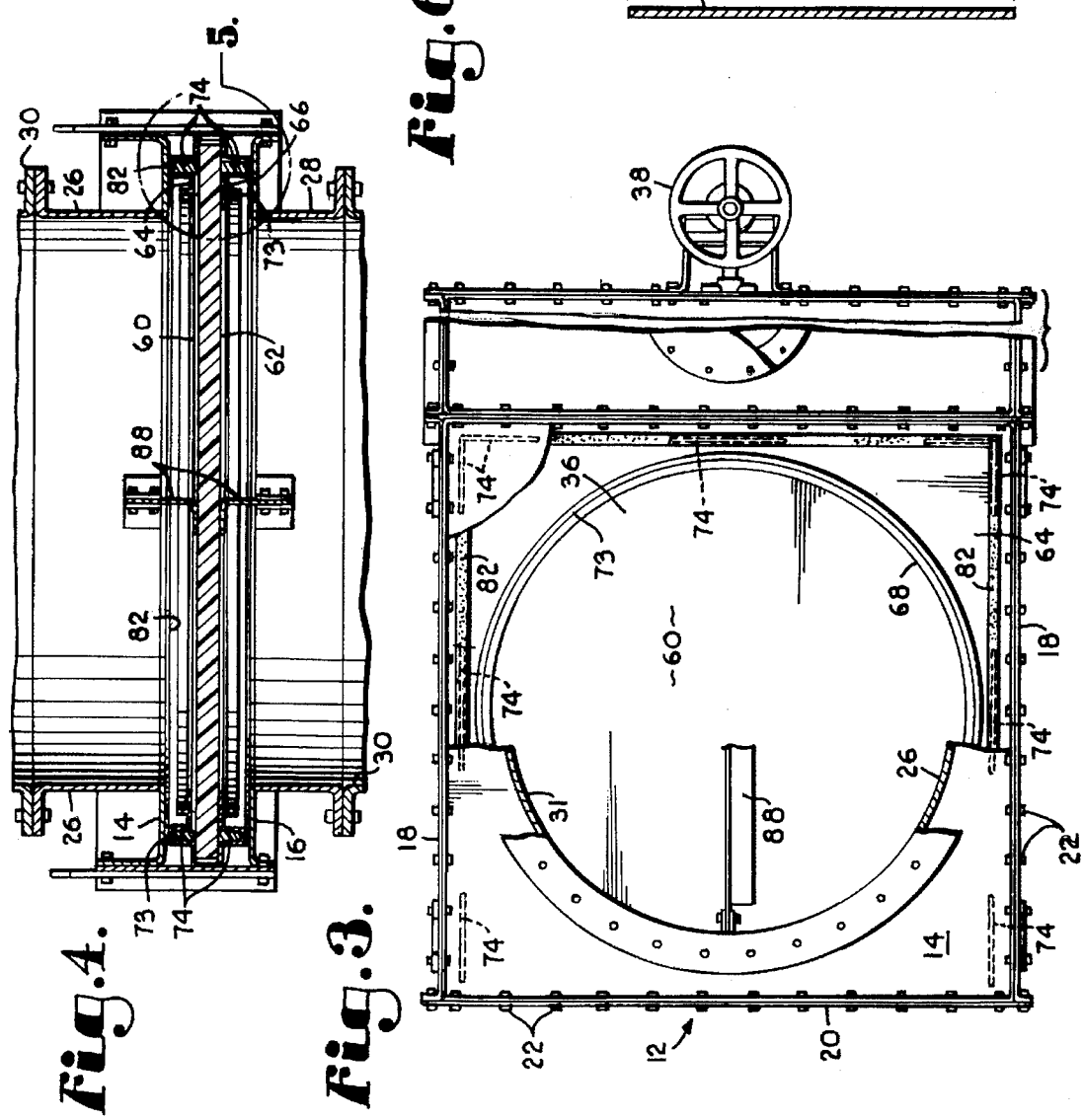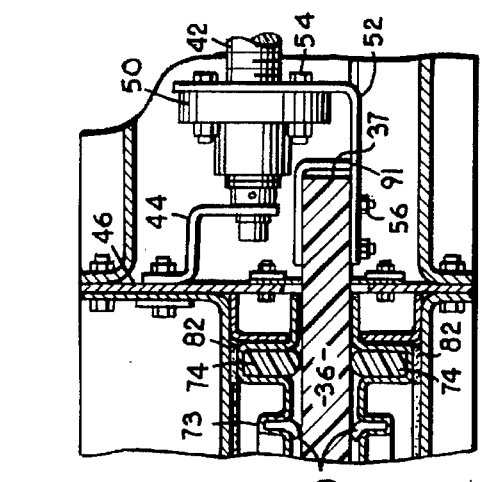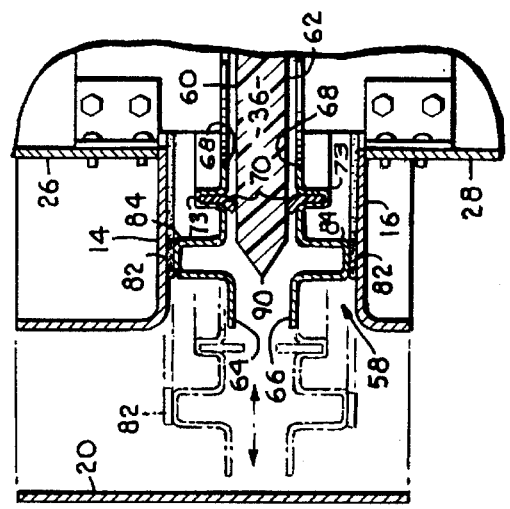

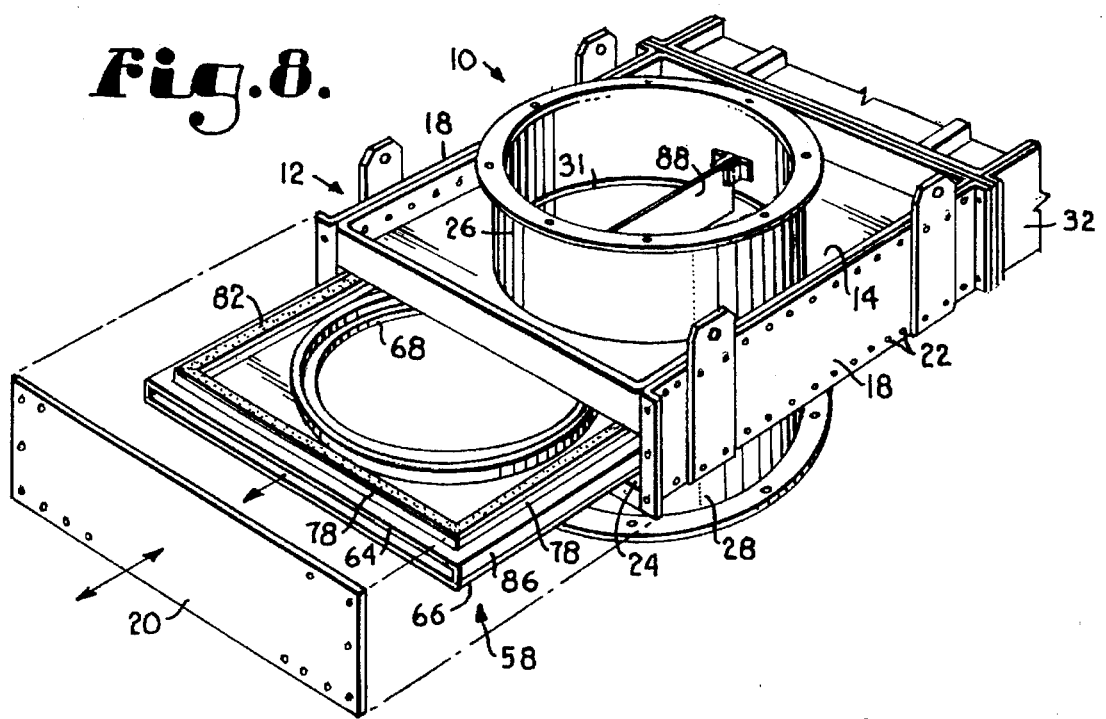
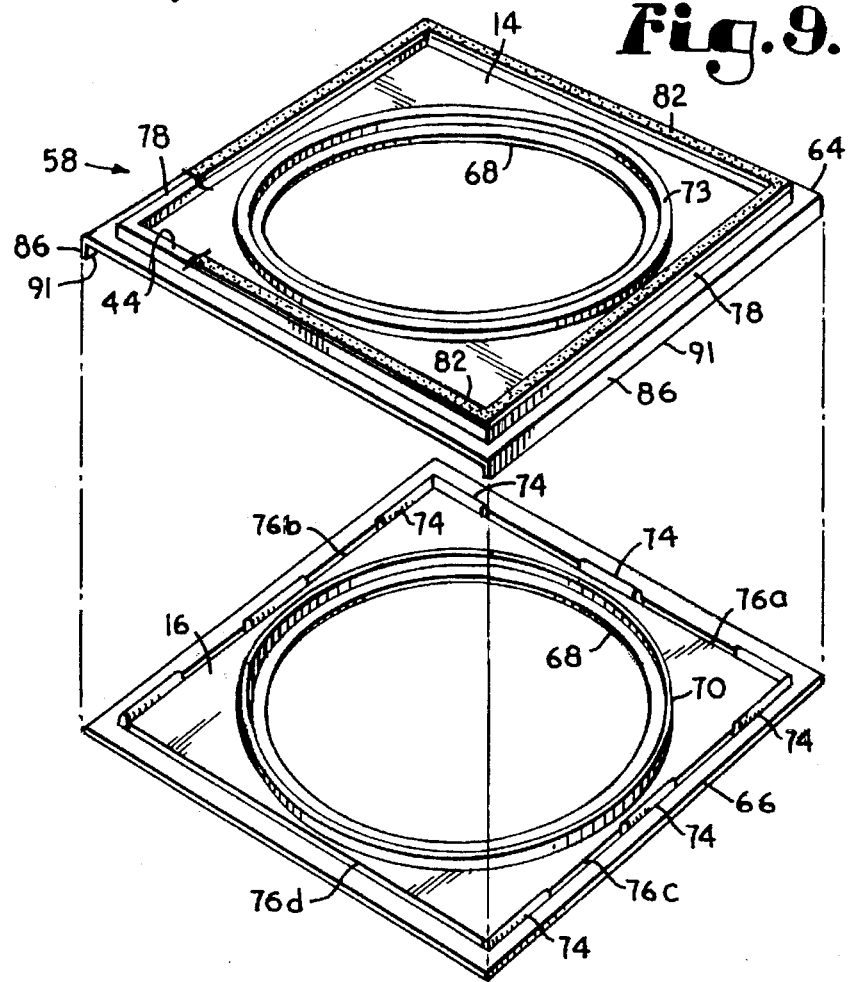

ISOLATION DAMPER WITH REPLACEABLE SEAL UNIT

This invention relates generally to isolation dampers for positioning in ductwork used in conjunction with caustic environments and, more specifically, a replaceable seal unit for use in such dampers.

In recent years, the manufacturing f silicon microchips has become increasingly important with their increased use in numerous products. The manufacturing of these chips typically involves an acid etching process to form micro circuits on a silicon wafer. As is apparent, the types of acids and solvents used for this etching process are highly caustic. Therefore, there is a crucial need to adequately vent the area in which the chips are manufactured. The area in which chips are manufactured is typically referred to as a "clean room" and has highly regulated air supply and venting systems to prevent contamination of the chips and also to allow discharge of caustic gases from the room. Therefore, it is important to be able to isolate a "clean room" at different times from the rest of a venting or air supply system.

Usually, such isolation of a room occurs through the use of a slide gate damper positioned in the ductwork leading to the clean room. These slide gates have a blade which is positionable between an open position which allows gases to pass through the ductwork and a closed position which completely blocks and seals off the ductwork. The blade of the isolation damper is actuated either by hand or an electric motor. These isolation dampers are typically made of a fiberglass material as is the other ductwork of the air supply system. The fiberglass material does not corrode as do metal structures when subjected to the caustic environments in the manufacturing rooms.

The slide gates normally have a sealing structure made of a flexible material to allow an airtight seal of the manufacturing room. The seal is typically made of a closed cell elastomeric material which is capable of deforming when contacted by the blade to engage the blade in a sealing arrangement. Although the fiberglass material of the damper is resistant to the caustic gases, the sealing structure is not as resistant. Therefore, the caustic gases within the manufacturing room, when vented therefrom through the damper, typically erode the flexible sealing structure. Because of this erosion, if the flexible seal is not removable, the entire damper has to be replaced periodically at great expense and labor. Further, if the flexible seal is replaceable in a damper, the replacement is often very time-consuming because it requires the detachment and removal of the sealing structure from the confined space within the damper and the reattachment of a new sealing structure within the confined space. Therefore, when the sealing structures of prior art dampers began to leak or break down, it was often necessary to shut down the entire supply/venting system leading to a particular room to replace the damper itself or the flexible sealing structure. As is apparent, such stoppage of production could result in a vast decrease in efficiency and profitability.

An additional problem with the flexible sealing structures of prior art dampers involves the deterioration of the flexible sealing structure due to forces exerted on the sealing structure by the blade of the damper during closing or when the blade is subjected to substantial pressures within the duct passageway. More specifically, during closing of the blade, the flexible sealing structure is often crushed within the damper by a misaligned or loosely aligned blade, thus resulting in failure of the seal. Further, after the blade reaches its closed position, the surface of the blade is often subject to intense air pressure within the duct passageway. The blade tends to transfer this pressure to the sealing structure, thus "crushing" the sealing structure between the blade and the interior structure of the damper. This also sometimes leads to failure of the sealing structure.

Therefore, an isolation damper is needed which overcomes the drawbacks of the prior art dampers discussed above.

Accordingly, it is a primary object of the present invention to provide an isolation damper for use, in caustic environments where the sealing structure can be easily and periodically changed.

A further important object of this invention is to provide an isolation damper where the sealing structure is protected from crushing forces associated with closing of the blade of the damper and from crushing forces associated with gas pressure being exerted on the blade when closed.

These and other important aims and objectives of the present invention will be further described, or will become apparent from the following description and explanation of the drawings, wherein:

FIG. 1 is a top perspective view of an isolation damper embodying the principles of this invention, the damper shown oriented in a horizontal position to accommodate vertically extending ductwork;

FIG. 2 is an enlarged detailed cross-sectional view taken generally along line 2—2 of FIG. 1 showing the blade of the damper in its closed position so as to seal off the duct passageway in which the damper is disposed, and showing in phantom lines a portion of the blade in its open position;

FIG. 3 is a fragmentary top plan view of the damper FIG. 1 showing the damper blade in its closed position, parts being broken away to reveal details of construction;

FIG. 4 is a detailed cross-sectional view taken generally along line 4—4 of FIG. 2 showing the engagement of the seal members with the blade;

FIG. 5 is a fragmentary enlarged detailed view of the area designated by the numeral 5 in FIG. 4 showing the seal members deflected by the blade and the blade supported by the guide block segments;

FIG. 6 is a fragmentary enlarged detailed view of the area designated by the numeral 6 in FIG. 2 showing the actuating mechanism for moving the blade between its open and closed positions, the blade shown in its closed position;

FIG. 7 is an enlarged fragmentary detailed view of the area designated by the numeral 7 in FIG. 2 showing the lower end of the blade in its closed position, and showing in phantom lines the positioning of a seal unit in the seal chamber of the damper housing;

FIG. 8 is a fragmentary top perspective view of the damper of FIG. 1 showing the bottom access panel removed and the positioning of a seal unit within the seal chamber of the damper housing; and FIG. 9 is a top perspective exploded view of a seal unit for positioning within the damper housing.

An isolation damper embodying the principles of this invention is broadly designated in the drawings by the reference numeral 10. Damper 10 has a housing 12 formed by top panel 14, bottom panel 16, side panels 18 and access panel 20 as best shown in FIGS. 1 and 2. Panels 14, 16, 18 and 20 are all secured together by bolts 22 to form an interior sealing chamber 24 as best shown in FIGS. 5 and 8.

Top panel 14 has a cylindrical upwardly extending duct connecting flange 26 and bottom panel 16 has a cylindrical downwardly extending duct connecting flange 28. Each panel 14 and 16 has an opening 31 which is encircled by the respective connecting flange 26 and 28. Openings 31 allow passage of gases into and out of sealing chamber 24. Flanges 26 and 28 are each connected to the corresponding supply ductwork 30 so that housing 12 is disposed within a duct passageway, as best shown in FIGS. 2 and 4. Thus, damper 12 can be used to prevent or allow the passage of gas through a duct, as will be more fully described below. Although damper 10 is shown in FIGS. 1, 2 and 4 as being connected to a vertically extending duct, the damper can also be easily positioned in a horizontally extending duct.

Attached to the end of housing 12 that is opposite access panel 20 is an actuating mechanism case 32, as best shown in FIGS. 1 and 2. Case 32 contains actuating mechanism 34 which is used to position a blade 36 between an open and a closed position. Mechanism 34 includes an actuating handle 38 positioned outside of case 32. Handle 38 can be manually rotated to move blade 36 between its open and closed positions. Handle 38 is rotatably connected to a 90 degree transfer box 40 which in turn is connected to an actuating screw 42. Screw 42 is rotatably supported within case 32 by a support flange 44 attached to a wall 46 of case 32 that is adjacent housing 12 as best shown in FIG. 6. The other end of screw 42 is rotatably supported by a wall 48 of case 32 that is adjacent transfer box 40, as best shown in FIG. 2. A traveling member 50 is received on the threads of screw 42 so that rotation of the screw will cause member 50 to move along the screw within case 32. A connecting bracket 52 is attached on one end to member 50 via bolts 54 and on the other end to an upper edge 37 of blade 36 via bolts 56, as best shown in FIG. 6. Thus, movement of traveling member 50 along screw 42 will result in movement of blade 36. In FIG. 2, traveling member 50 is shown positioned along screw 42 adjacent bracket 44 which corresponds to the closed position of blade 36. Further, traveling member 50 is shown in phantom lines in FIG. 2 at a location adjacent wall 48. This location corresponds to the open position of blade 36.

As best shown in FIGS. 2–7, when blade 36 is in its closed position, it is almost entirely located within, sealing chamber 24 of housing 12, except for its upper edge 37 that is connected to bracket 52. A sealing unit 58, is also disposed in chamber 24 and engages the upper surface 60 of blade 36 and the lower surface 62 of blade 36. Sealing unit 58 includes an upper integrally formed sealing plate 64 and a lower integrally formed sealing plate 66 as best shown in FIGS. 4, 5, 7 and 9. Both plates 64 and 66 have generally circular openings 68 formed therein, as best shown in FIGS. 3, 7 and 9. Openings 68 allow gas to pass through housing 12 when blade 36 is in its open position. Each plate 64 and 66 also has an annular flexible sealing member or ring 70 disposed in an annular trough 72 formed by an outer bulge 73 of the plate, as best shown in FIGS. 2, 5, 6 and 7. Sealing ring 70 is preferably formed of a closed cell elastomer material, for instance, closed cell SCE-45 EPDM. Ring 70 is held within trough 72 by a suitable adhesive, for instance, "Loctite 454."

Each plate 64, 66 also has a plurality of guide block segments 74 attached to the plate adjacent the outer edges of the plate, as best shown in FIG. 9. Guide segments 74 are positioned in a channel 76 formed in the plate by an outward deformation 78, as best shown in FIG. 5. Channel 76 extends adjacent to each edge of its respective plate so that it has an overall square configuration. Segments 74 are spaced within channel 76. More specifically, the portion 76a of channel 76 that is adjacent the mechanism case 32 is provided with three separate segments 74, two of which are positioned adjacent the opposite right angle turns of the channel and the other one of which is positioned generally in the middle of portion 76a. Further, each of the channel portions 76b and 76c also have three segments 74 spaced therein. Channel portion 76d does not have any guide segments disposed therein. Each of guide segments 74 has a plurality of through openings 80 formed therein as shown in FIG. 5. To secure the particular guide segment within the channel 76, a resin is poured into the channel with the guide segment disposed therein. The resin flows through the openings 80 and hardens in the channel to secure the guide segment at its appropriate location therein, as best shown in FIG. 5. Guide segments 70 are preferably made of teflon.

Each plate 64, 66 also has a sealing pad 82 with an over-all square shape, which serves to seal the back surface of the plate with respect to the interior walls of the sealing chamber 24. As best shown in FIGS. 5 and 9, pad 82 extends along and is attached to the surface 84 of deformation 78 used to form channel 76. Sealing pad 82 is attached to surface 84 by a suitable adhesive, for instance "Loctite 454." Sealing pad 82 is preferably formed of a closed cell elastomer material, for instance, SCE-45 EPDM.

Upper sealing plate 64 has spacing flanges 86 formed integrally with and extending from opposite edges thereof, as best shown in FIGS. 5 and 9. Flanges 86 serve to space plates 64 and 66 away from one another when they are in sealing chamber 24 to allow room therebetween for blade 36 to pass when moving from its open position to its closed position.

Each connecting flange 26 and 28 has a blade support member 88 extending from one side of the connecting flange to the other side across the respective opening 31. Support 88 helps prevent movement of blade 36 when subjected to the air pressure exerted on the blade when the blade is in its closed position.

In operation, blade 36 is actuated between its open and closed positions to allow or prevent flow of gases through ductwork 30. To move blade 36 to its closed position shown in FIG. 2, handle 38 is actuated to move traveling member 50 towards housing 12 and, thus, blade 36 towards its closed position. As blade 36 moves toward its closed position, the leading pointed edge 90 of the blade extends between the guide segments 74 of the sealing plates 64 and 66, and deforms the sealing members 70 of the plates 64 and 66, as shown in FIGS. 2, 5 and 6. The deformation of sealing members 70 so that they engage the adjacent surfaces of blade 36 effectuates an adequate seal between blade 36 and the duct passageway to seal off one side of the duct passageway from the other side. In this manner, a manufacturing room can be sealed off from the rest of a supply/venting system. Guide segments 74 serve to guide blade 36 to its closed position and also serve to support it in closed position. If blade 36 is slightly misaligned or moved from its alignment due to air pressure passing through the duct during closing of the blade, the guide segments prevent the blade from crushing the seal members 70 between the blade and the plates 64, 66. Further, after blade 36 has reached its closed position, the guide segments also prevent crushing of the seal members by supporting the blade a set distance away from the plates 64, 66 even when the blade is subjected to substantial air pressure within the duct passageway. Further, the weight of the blade itself is not allowed to crush the seal member because, again, the guide segments support the blade a spaced distance away from the plates.

As shown in FIGS. 5 and 6, sealing pad 82 of sealing plate 64 contacts the inner surface of upper panel 14 of housing 12 and sealing pad 82 of sealing plate 66 contacts the inner surface of bottom panel 16. Thus, the sealing pads on the respective sealing plates effectuate a seal between the plate and the housing. This seal prevents gas from escaping from the housing around the back side of plates 64, 66.

Ductwork 30, housing 12, plates 64, 66, and blade 36 are all preferably made of a fiberglass material to prevent corrosion of the structures when subjected to the caustic gases often found in a chip manufacturing room. However, as described, sealing member 70 and sealing pad 82 must be made of an elastomer material to perform an adequate sealing function between the plates and the blade and between the plates and the housing, respectively. Further, guide segments 74 are preferably made of a teflon material to have enough give and leeway to perform their guiding and supporting function. Therefore, sealing member 70, sealing pads 82 and guide segments 74 all tend to break down at a much quicker rate than the other structures of the damper when subjected to caustic gases. In the past, breakdown of the elastomer seals within a damper required replacement of the entire damper or a complicated seal replacement process. The sealing structure of the inventive damper 10 can be easily replaced simply by changing the seal unit 58. More specifically, with reference to FIGS. 8 and 9, after the sealing member 70 or sealing pad 82 have worn out within a damper, access panel 20 is removed from the housing by removing bolts 22. Thereafter, the old sealing unit 58 can be slid out of sealing chamber 24. A new sealing unit with new sealing members 70, new sealing pads 82, and new guide segments 74 are slid into sealing chamber 24. To slide the new sealing unit into housing 12, upper sealing plate 64 with spacing flanges 86 is positioned together with lower sealing plate 66 so that the bottom edges 91 of the spacing flanges engage the inner surface of lower sealing plate 66 as best shown in FIGS. 5, 6, 8 and 9. With plates 64 and 66 positioned in this manner and held together in this fashion by the person making the replacement, plates 64, 66 can then be slid within the sealing chamber as a combined structure. It should be noted that channel portion 76d of each plate 64, 66 is positioned adjacent the end of housing 12 that is opposite mechanism case 32. After sealing unit 58 has been positioned within sealing chamber 24, access panel 20 is reattached to housing 12 by refastening bolts 22. Therefore, an easy, quick and convenient change of the sealing structure of damper 10 is accomplished with minimal loss of production.

In addition to access panel 20 being removed from housing 12, it may be possible to construct housing 12 such that either one of side panels 18 can also be removed by loosening bolts 22. Thus, if side panels 18 are removable, replacement of a seal unit can be accomplished along any side of housing 12, except for the side which is connected to mechanism case 32.

Although damper 10 is shown as adopted for use with generally circular ductwork 30, it can also be constructed to accommodate rectangular ductwork. More specifically, openings 31 and flanges 26, 28 can be construed of a suitable rectangular shape. Further, sealing members 70 and trough 72 can also be constructed to be of a suitable rectangular shape.

Having described the invention what is claimed:

1. An isolation damper for positioning in a duct passageway comprising:

a housing positioned in the duct passageway and forming a sealing chamber, said housing having a removable access panel for providing access to said seal chamber;

a blade capable of being actuated between an open position wherein it allows passage of gas through said housing and a closed position wherein the passage of gas through said housing is blocked;

a replaceable seal unit including a first sealing plate and a second sealing plate, each of said plates having an opening formed therein to allow passage of gas therethrough, and wherein said sealing plates are slidably positionable within said sealing chamber by removing said access panel, each of said plates also including:

first sealing means, extending around the periphery of the opening and for contacting a side of said blade when said blade is in its closed position to prevent passage of gas through said housing;

guide means for guiding said blade to its closed position and preventing crushing of said sealing means; and second sealing means for sealing said plate with respect to the interior surface of the housing.

* * * * *